United States Patent
Weeks et al.

(10) Patent No.: US 6,321,802 B1
(45) Date of Patent: Nov. 27, 2001

(54) ICE AND BEVERAGE DISPENSING APPARATUS

(75) Inventors: Robert J. Weeks, Highland Village; Michael J. Zalta, Richardson, both of TX (US)

(73) Assignee: Scotsman Group, Inc., Vernon Hills, IL (US)

( * ) Notice: Subject to any disclaimer, the term of this patent is extended or adjusted under 35 U.S.C. 154(b) by 0 days.

(21) Appl. No.: 09/332,744

(22) Filed: Jun. 14, 1999

(51) Int. Cl.[7] .................................................. B65B 1/04
(52) U.S. Cl. ..................... 141/362; 141/360; 141/351; 141/352; 222/1; 222/461
(58) Field of Search .................... 141/360, 361, 141/362, 351, 352; 62/344, 377; 222/241, 242, 410, 540, 146.6, 1, 153.14, 461, 505, 185.1

(56) References Cited

U.S. PATENT DOCUMENTS

| | | |
|---|---|---|
| 4,102,660 | 7/1978 | Beckett et al. . |
| 4,679,715 | 7/1987 | Hovinga . |
| 4,981,237 | 1/1991 | Landers . |
| 5,029,737 | 7/1991 | Yamamoto . |
| 5,054,654 | 10/1991 | Schroeder et al. . |
| 5,104,007 | 4/1992 | Utter . |
| 5,129,547 | 7/1992 | Fisher et al. . |
| 5,279,445 | 1/1994 | Fisher et al. . |
| 5,437,391 | 8/1995 | Landers et al. . |
| 5,660,307 | 8/1997 | Schroeder et al. . |
| 5,829,646 | 11/1998 | Schroeder et al. . |
| 5,860,564 | * 1/1999 | Jablonski ........................ 141/362 |

OTHER PUBLICATIONS

Servend International Inc., *Servend Ice & Beverage Systems*, 1997.

* cited by examiner

*Primary Examiner*—Steven O. Douglas
*Assistant Examiner*—Khoa Huynh
(74) *Attorney, Agent, or Firm*—Ohlandt, Greeley, Ruggiero & Perle, LLP

(57) ABSTRACT

An automatic ice and beverage dispensing machine having an ice dispensing chute assembly which is rotatable. As a rotating chute rotates rearward, a lifting motion first moves a locking device which locks a door in place and then elevates the door so that ice can freely flow from an ice storage bin. A switch is contacted which initiates the flow of ice from the ice storage bin. Releasing the rotating chute causes it to rotate (due to gravity) back to its initial, neutral position, disengaging the switch and stopping the flow of ice from the ice storage bin, reversing the lifting action on the door and the locking device, closing the door and locking the door in place to prevent further flow of ice from the ice storage bin.

6 Claims, 4 Drawing Sheets

ICE AND BEVERAGE DISPENSING APPARATUS

BACKGROUND OF THE INVENTION

1. Technical Field

The present invention relates generally to an apparatus for dispensing ice and beverages. More particularly, the present invention relates to a unique construction for an ice dispensing chute assembly for use with the apparatus for dispensing ice and beverages.

2. Discussion

Counter top type automatic ice and beverage dispensing machines are commonplace. These ice and beverage dispensing machines are found in food and drink service establishments, hotels, motels, sports arenas and various other places where large quantities of ice and beverages are needed on a continuous basis. Some of these machines utilize flaked ice while others utilize ice shaped in a variety of configurations which are generally referred to as cubes. The present invention relates to an ice and beverage dispensing machine that utilizes ice which is both flaked or shaped in one of these various configurations of cubes.

Available counter top space is an important consideration in small convenience stores, cafeterias, concession stands, fast food restaurants and other such similar 0 establishments. Accordingly, as a result of a limited amount of counter top space, certain ice and beverage dispenser size and dimensional requirements are set based on practical limitations such as everyday operation and routine maintenance. Combined ice and chilled beverage dispensers are desirable because they are capable of increasing efficiency by eliminating the need for two separate machines thereby making more counter space available.

Counter top type automatic ice and beverage dispensing machines generally include an insulated sanitary ice storage bin, a drive train system, including a rotor, paddle wheel or auger, for delivering the ice, a door that opens to permit the flow of ice and closes to stop the flow of ice when a user has received the quantity of ice that he/she expects, and a dispensing chute to direct the flow of ice into the user's container. Additionally, an agitation system is provided to agitate the stored ice to prevent fusion which occurs over time when pieces of ice are in contact with each other.

A universal and long standing problem associated with ice and beverage dispensing machines is excessive ice spillage due to ice run over. This problem is recognized and known by anyone who has added ice to containers through the use of an automatic ice and beverage dispensing machine.

Normally, when adding ice to a container before filling the container with a beverage, the container or the user himself/herself pushes against a lever, plate or button which starts the dispensing process and the flow of ice. Accordingly, ice travels from the ice storage bin into an ice dispensing chute, falling into the container placed directly below the ice dispensing chute. When the desired amount of ice is obtained, the container or user disengages the lever, plate or button. A problem occurs as ice often continues to fall from the dispensing chute as the container is pulled away, dropping ice onto the sink beneath the chute or, worse, the floor. This causes more ice than is desired to flow into the container, wasting ice and causing potential slipping hazards if the excess ice falls on the floor. Preventing the problem requires the user to be particularly adept at withdrawing the container to release the lever, plate or button before the desired amount of ice falls into the container while continuing to hold the container under the dispensing chute until the ice stops falling. These problems exist in the filling of all such containers from cups to ice buckets to bags.

In order to overcome the problems associated with excessive ice spillage due to ice run over, various designs of ice dispensing door assemblies and ice dispensing chute assemblies have been developed. The continued development of these types of ice and beverage dispensing machines has been directed to designs which simplify the manufacturing process and the assembly of the ice dispensing door assemblies and the ice dispensing chute assemblies while keeping costs at a minimum and performance of the ice dispensing door assemblies and the ice dispensing chute assemblies at a maximum.

SUMMARY OF THE INVENTION

The principle object of the present invention is to provide a combined ice and beverage dispensing apparatus that prevents excessive ice spillage due to ice run over.

A related object of the present invention is to provide an ice dispensing chute assembly which stops the flow of ice from the ice storage bin and shortly thereafter closes the door preventing further ice particles from exiting the ice dispensing chute.

It is still yet another object of the present invention to provide an ice dispensing chute assembly which locks its door in place preventing the flow of ice from the ice dispensing chute during operation of the agitation system.

The present invention provides an ice dispensing chute assembly including a rotating chute which is pivotally attached to a pair of brackets. The pair of brackets are mounted to an outer surface of an ice storage bin. Also pivotally attached to the pair of brackets is a door assembly. A switch is mounted to an inside surface of one of the brackets. When activated, the switch initiates the process by which ice from the ice storage bin is dispensed through the ice dispensing chute assembly.

By rotating the ice dispensing chute, either by pushing on a lower push lever with a cup or container, or by pushing on an elevated surface resembling a push button, the ice dispensing chute is rotated rearward towards the ice storage bin. As the ice dispensing chute rotates rearward towards the ice storage bin, it also has a lifting motion which first moves the locking device which locks the door in place and then elevates the door so that ice can freely flow from the ice storage bin. When a user has received the desired volume of ice, removal of pressure from the ice dispensing chute allows it to rotate (due to gravity) back to its neutral position. As the ice dispensing chute returns to its neutral position, it reverses the lifting action on the door and locking mechanism, and they both return back to a position which prevents the further flow of ice from the ice storage bin.

Other advantages, benefits and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention:

FIG. 4 is a side elevational view of the ice dispensing chute assembly shown in FIG. 1 in an initial, neutral, closed position;

DETAILED DESCRIPTION OF THE PREFERRED EMBODIMENT

Figure 1:
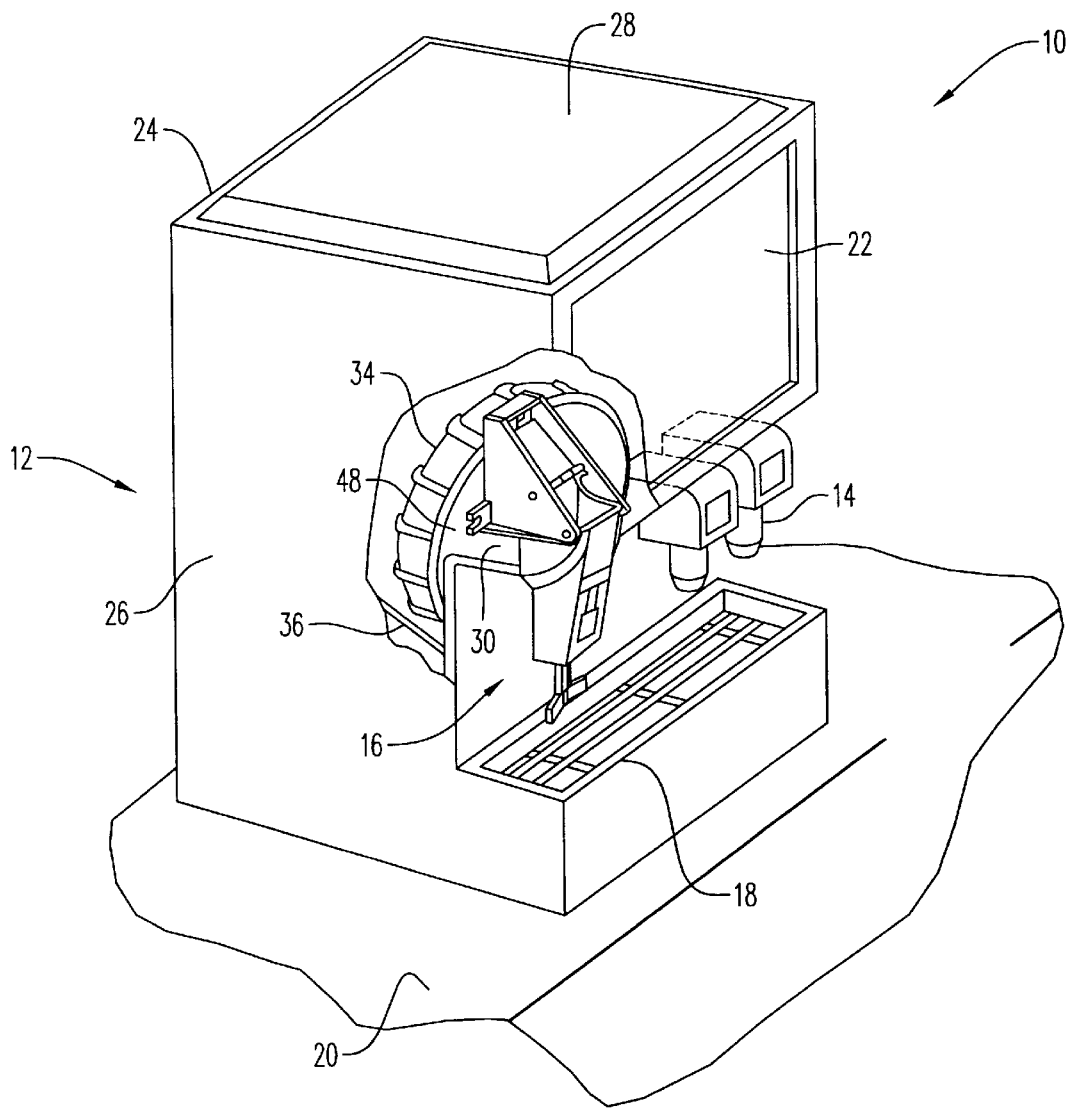
FIG. 1 is a fragmentary perspective view of an automatic ice and beverage dispensing machine incorporating the unique ice dispensing chute assembly in accordance with the present invention.

Referring now to the drawings in which like reference numerals designate like or corresponding parts throughout the several views, there is shown in FIG. 1 an automatic ice and beverage dispensing machine incorporating the unique ice dispensing chute assembly in accordance with the present invention which is designated generally by reference numeral 10. The automatic ice and beverage dispensing machine 10 includes an ice storage bin 12, several beverage dispensing valves 14, an ice dispensing chute assembly 16 and a drain sink 18. The combined ice and beverage dispensing machine 10 is adapted to be mounted on a flat surface 20.

The ice storage bin 12 includes longitudinally spaced front and rear walls 22 and 24, and laterally spaced side walls 26 (one shown) which extend vertically upward from a base to form an open container for easy internal access. The ice storage bin 12 further includes a lid 28 which allows for closure of this open container. The front wall 22 is provided with an inclined discharge chute 30 to deliver ice from the ice storage bin 12 to the ice dispensing chute assembly 16. The inclined discharge chute 30 has an inclined surface 32 on which ice from the ice storage bin 12 travels during the dispensing cycle.

The ice storage bin 12 houses a cylindrical rotor, paddle wheel or auger 34 for scooping up ice in the ice storage bin 12 and delivering this ice to the inclined discharge chute 30. A sweep arm 36 for agitating the ice, and an electric motor (not shown) having a drive shaft (not shown) for simultaneously rotatably driving the cylindrical rotor, paddle wheel or auger 34 and the sweep arm 36 together as a unit are also housed in the ice storage bin 12.

Figure 2:
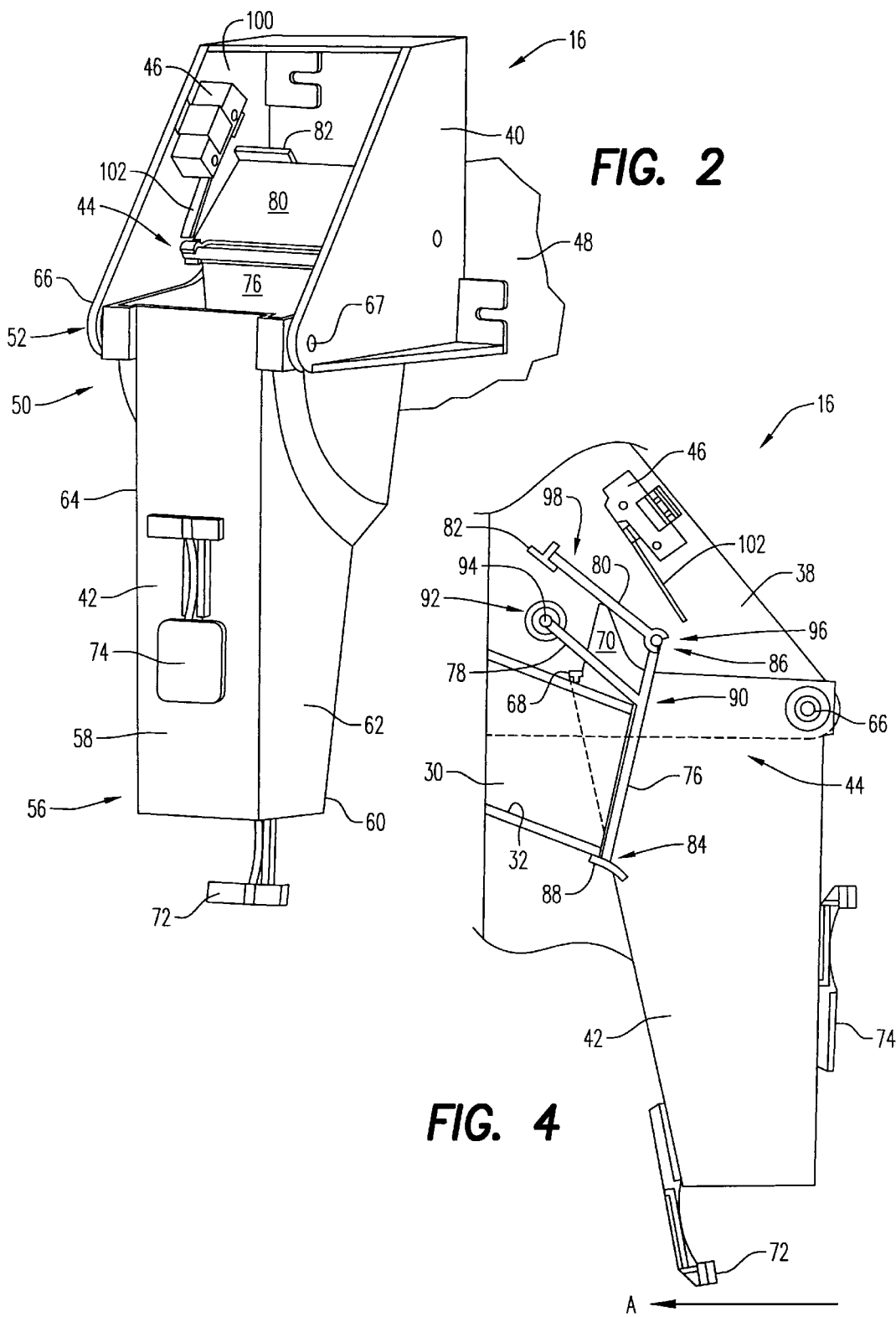
FIG. 2 is a front perspective view of the ice dispensing chute assembly shown in FIG. 1.
Figure 3:
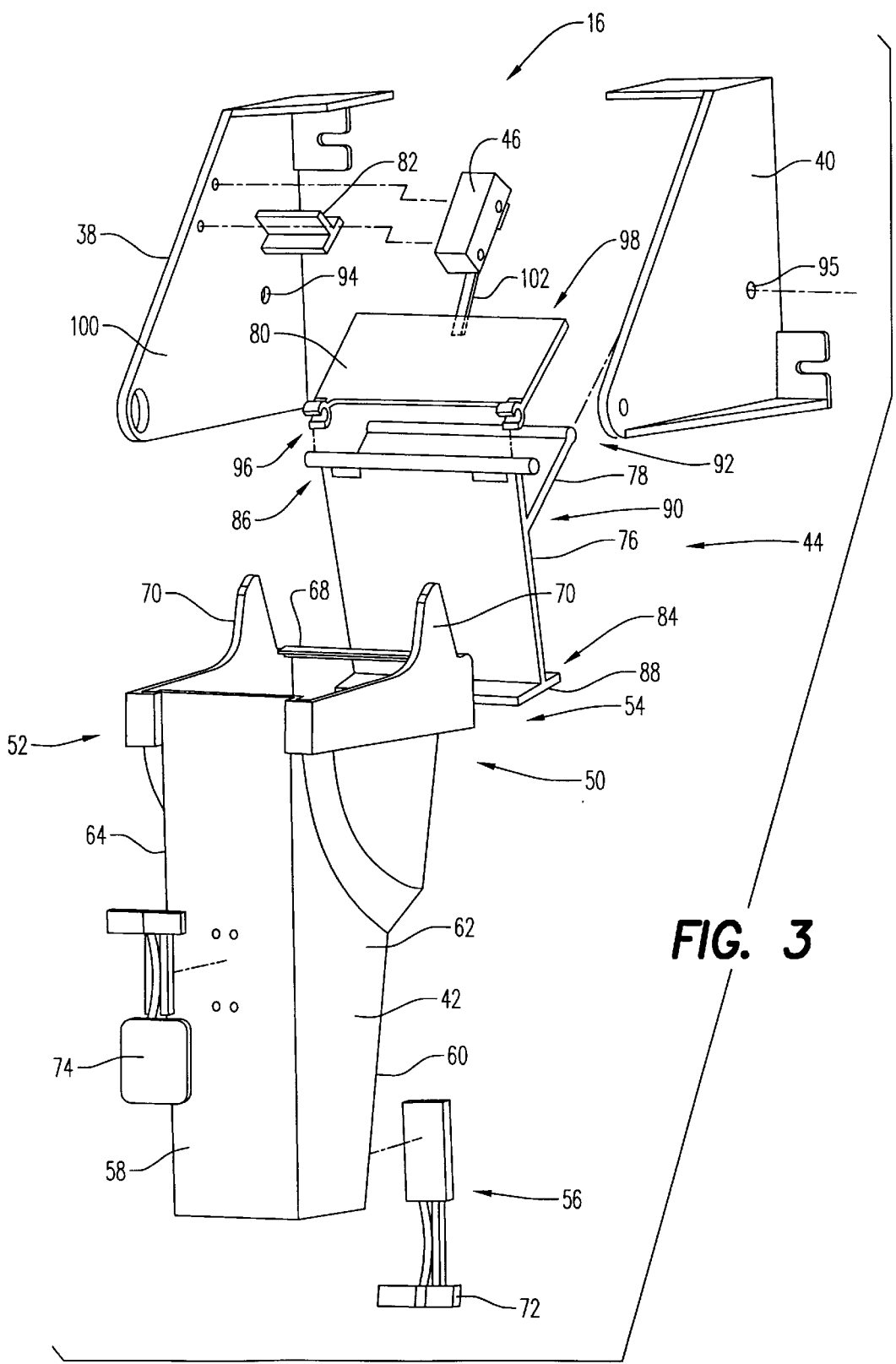
FIG. 3 is an exploded perspective view of the ice dispensing chute assembly shown in FIG. 1.
Figures 5, 6:
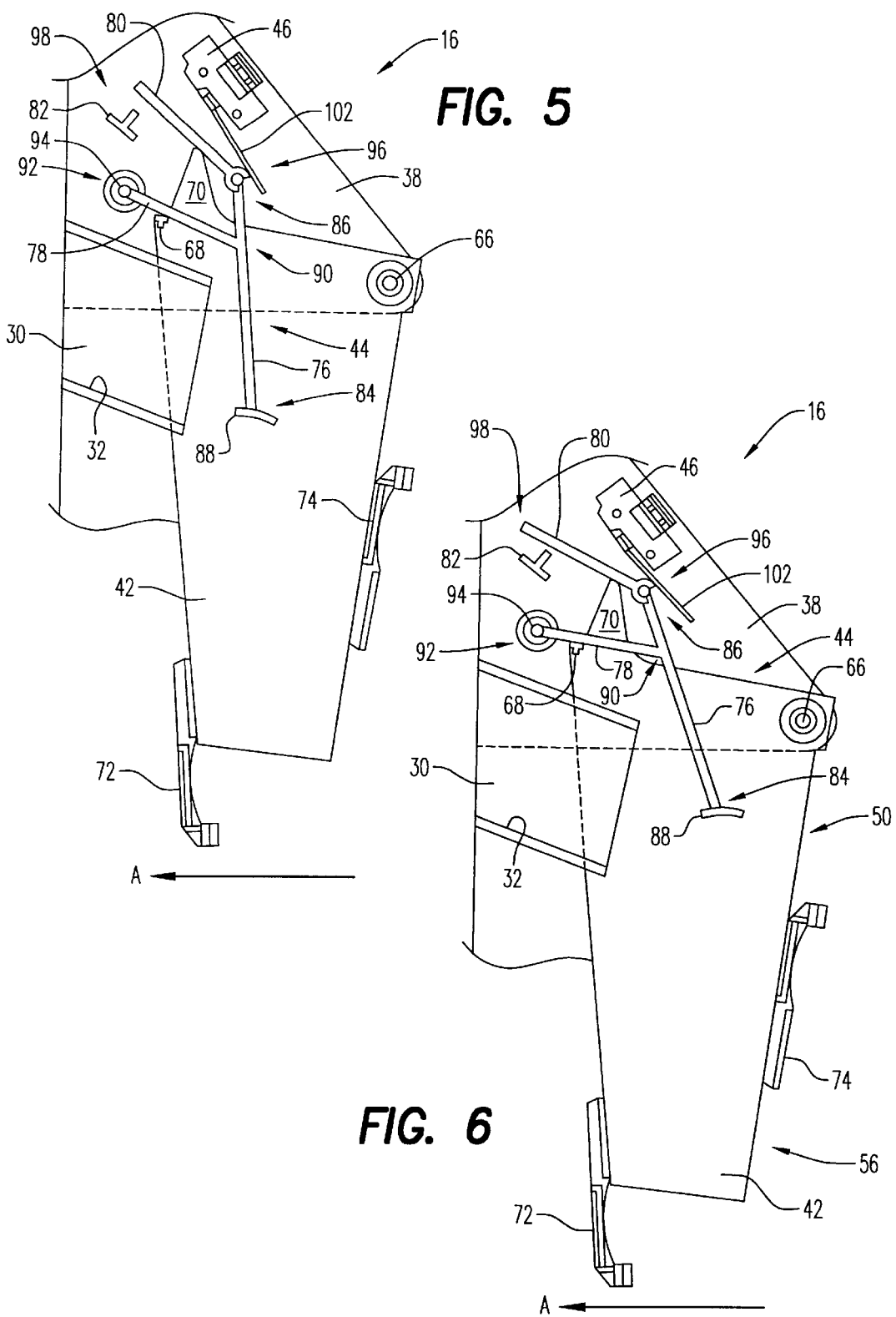
FIG. 5 is a side elevational view of the ice dispensing chute assembly shown in FIG. 1 in an intermediate position.
FIG. 6 is a side elevational view of the ice dispensing chute assembly shown in FIG. 1 in a fully extended, open position.

Referring now to FIGS. 2 and 3, the ice dispensing chute assembly 16 is shown including a left side bracket 38, a right side bracket 40, a rotating chute 42, a door assembly 44 and a switch 46. The left side bracket 38 and the right side bracket 40 are mounted by any suitable mounting means to an outer surface 48 of the ice storage bin 12. As illustrated in FIGS. 4–6, located between the left side bracket 38 and the right side bracket 40 is the inclined discharge chute 30.

The rotating chute 42 is in communication with and located adjacent to the inclined discharge chute 30. The rotating chute 42 is generally rectangular in shape and includes an upper portion 50 having a forward end 52 and a rearward end 54, a lower portion 56, a front wall 58, a rear wall 60, a right side wall 62 and a left side wall 64. The rotating chute 42 is pivotally attached to the left side bracket 38 and the right side bracket 40 at pivot points or shafts 66 and 67 located at the forward end 52 of the upper portion 50. The rearward end 54 of the upper portion 50 of the rotating chute 42 is supported by a shaft 68 having a T-shaped cross section. The T-shaped shaft 68 extends between the left side wall 64 and the right side wall 62 of the rotating chute 42.

The rotating chute 42 also includes an upwardly extending projection 70 located at the rearward end 54 of the upper portion 50. A lever 72 is located at the lower portion 56 of the rotating chute 42. A notch (not shown) in the rear wall 60 at the lower portion 56 of the rotating chute 42 may be included to help locate the lever 72. An elevated surface resembling a push button 74 is located on the front wall 58 of the rotating chute 42.

As illustrated in FIGS. 2–6, the door assembly 44 of the ice dispensing chute assembly 16 includes a door 76, a door support 78, a rotating latch member 80 and a T-shaped stop 82. The door 76 of the door assembly 44 includes a distal end 84 and a proximal end 86 having shafts 87. The distal end 84 of the door 76 includes a drip edge 88 which extends below the inclined surface 32 of the inclined discharge chute 30 when the door 76 is in its fully closed position as illustrated in FIG. 4. The door support member 78 is generally triangular in shape and includes a distal end 90, a proximal end 92, a left side wall 93, a right side wall 97 and an inclined back wall 99. The distal end 90 of the door support member 78 is connected to the door 76 intermediate the distal end 84 and the proximal end 86 of the door 76, while the proximal end 92 of the door support member 78 is pivotally attached to the left side bracket 38 and the right side bracket 40 at pivot points or shafts 94 and 95, respectively.

The rotating latch member 80 of the door assembly 44 includes a distal end 96 and a proximal end 98. The distal end 96 of the rotating latch member 80 snaps onto and pivots about the shafts 87 of the proximal end 86 of the door 76. While the door 76 is in a fully closed position, the proximal end 98 of the rotating latch member 80 rests on the T-shaped stop 82 as illustrated in FIG. 4. Thus, when ice is no longer required by the user, the door 76 of the door assembly 44 of the ice dispensing chute assembly 16 is substantially locked in place preventing the further flow of ice.

The switch 46 of the ice dispensing chute assembly 16 is mounted, by any suitable mounting means, to either the left side bracket 38 or the right side bracket 40. The switch 46 is illustrated in FIGS. 2–6 as being mounted to an inner surface 100 of the left side bracket 38. The switch 46 includes a lever arm 102. The switch 46 can be of any standard, commonly known switch in the industry. When activated, the switch 46 initiates the process by which ice from the ice storage bin 12 is dispensed. The combination of the door assembly 44 and the switch 46 of the ice dispensing chute assembly 16 prevents excessive ice spillage due to ice run over by stopping the flow of ice from the ice storage bin 12 and shortly thereafter closing the door 76 preventing such excessive ice from exiting the inclined discharge chute 30.

FIGS. 4–6 illustrate the ice dispensing chute assembly 16 as it progresses through an initial, neutral operating position, an intermediate operating position and a fully extended, open operating position, respectively. As illustrated in FIG. 4, the ice dispensing chute assembly 16 is in its initial, latched, neutral position. The door 76 of the door assembly 44 is securely closed, the drip edge 88 extends below the inclined surface 32 of the inclined discharge chute 30, preventing ice from exiting the inclined discharge chute 30. The proximal end 98 of the rotating latch member 80 is resting on the T-shaped stop 82. During operation, when ice is required, a user pushes on the push lever 72 with a cup or pushes on the elevated surface resembling a push button 74 which thereby causes the rotating chute 42 to rotate in a rearward direction towards the ice storage bin 12 in the direction of arrow A. As the rotating chute 42 continues to rotate, the upwardly extending projection 70 engages the rotating latch member 80 lifting it off of and away from the T-shaped stop 82. As the rotating chute 42 continues to rotate in its rearward direction towards the ice storage bin 12, in the direction of arrow A, the shaft 68, having a T-shaped cross section and extending between the left side wall 64 and the right side wall 62 of the rotating chute 42, contacts the door support member 78 at a point intermediate the distal end 90 and the proximal end 92 of the door support member 78 causing the door 76 to rotate open.

As illustrated in FIG. 5, further rotation of the rotating chute 42 in a rearward direction towards the ice storage bin 12 in the direction of arrow A causes the shaft 68 to continue to engage the door support member 78 at a point intermediate the distal end 90 and the proximal end 92 of the door support member 78 causing the distal end 96 of the rotating latch member 80 to engage the lever arm 102 of the switch 46. With the switch 46 engaged, the flow of ice from the ice storage bin 12 is initiated. The engaged switch 46 causes the cylindrical rotor, paddle wheel or auger 34 to rotate, scooping up ice in the ice storage bin 12 and delivering it to the inclined discharge chute 30.

As illustrated in FIG. 6, as the rotating chute 42 continues to rotate, moving in a rearward direction towards the ice storage bin 12, in the direction of arrow A, the door 76 is in its fully open position and the switch 46 is fully engaged. Accordingly, with the door 76 in its fully open position, the flow of ice from the ice storage bin 12 enters the inclined discharge chute 30, exits the inclined discharge chute 30, and then enters the rotating chute 42 at the upper portion 50. The flow of ice then continues through the rotating chute 42 (due to gravity) exiting at the lower portion 56 of the rotating chute 42.

When a user has received the amount of ice that is preferred, removal of pressure from the lever 72 or the elevated surface resembling a push button 74 allows the rotating chute 42 to rotate (due to gravity) back to its initial, neutral position as illustrated in FIG. 4. As the rotating chute 42 rotates back to its initial, neutral position, the distal end 96 of the rotating latch member 80 disengages the switch 46 which stops the cylindrical rotor, paddle wheel or auger 34 from rotating which in turn stops the flow of ice from the ice storage bin 12 to the inclined discharge chute 30. Additionally, as the rotating chute 42 rotates back to its initial, latched, neutral position, the shaft 68, having a T-shaped cross section, disengages from the door support member 78 thereby allowing the door 76 to rotate back to its closed position. Thereafter, the upwardly extending projection 70 disengages from the rotating latch member 80 allowing the proximal end 98 of the rotating latch member 80 to return to the T-shaped stop 82 thereby preventing the door from opening and any remaining ice in the inclined discharge chute 30 from exiting into the rotating chute 42.

While the above detailed description describes the preferred embodiment of the present invention, it should be understood and appreciated that the invention is susceptible to modification, variation and alteration without departing from the proper scope and fair meaning of the accompanying claims.

What is claimed is:

1. An ice and beverage dispensing machine comprising:
   an ice storage bin;
   a plurality of beverage dispensing valves in communication with said ice storage bin; and
   an ice dispensing chute assembly in communication with said ice storage bin, said ice dispensing chute assembly including:
   a pair of brackets mounted to said ice storage bin;
   a rotatable chute pivotally attached to said pair of brackets, said rotatable chute including an upwardly extending projection;
   a door assembly pivotally attached to said pair of brackets;
   a limit switch mounted to one of said pair of brackets; and
   a shaft extending longitudinally between a first side and a second side of said rotatable chute;
   wherein said shaft engages said door assembly causing said door assembly to move to an open position and contact said limit switch.

2. The ice and beverage dispensing machine according to claim 1, further comprising an inclined discharge chute in communication with said ice storage bin and located between said pair of brackets, and a cylindrical rotor housed in said ice storage bin, wherein said cylindrical rotor scoops up ice in said ice storage bin and delivers said ice to said inclined discharge chute.

3. The ice and beverage dispensing machine according to claim 1, wherein said door assembly includes:
   a door having a distal end and a proximal end;
   a door support member pivotally attached to said pair of brackets at one end and connected to said door at a second end intermediate said distal end and said proximal end of said door;
   a rotating latch member pivotally attached to said proximal end of said door; and
   a stop mounted to at least one of said pair of brackets.

4. The ice and beverage dispensing machine according to claim 3, wherein said door further includes a drip edge connected to said distal end of said door.

5. The ice and beverage dispensing machine according to claim 1, further comprising a drain sink in communication with said plurality of beverage dispensing valves and said ice dispensing chute assembly.

6. The ice dispensing chute assembly of claim 1, wherein said rotatable chute includes a push lever.

* * * * *